United States Patent [19]

Loizeau

[11] Patent Number: 4,576,267

[45] Date of Patent: Mar. 18, 1986

[54] CENTRIFUGAL ACTUATOR DEVICE, IN PARTICULAR FOR A CLUTCH DISK ASSEMBLY

[75] Inventor: Pierre Loizeau, Ville D'Avray, France

[73] Assignee: Valeo, Paris, France

[21] Appl. No.: 616,221

[22] PCT Filed: Sep. 20, 1983

[86] PCT No.: PCT/FR83/00187

§ 371 Date: May 18, 1984

§ 102(e) Date: May 18, 1984

[30] Foreign Application Priority Data

Sep. 21, 1982 [FR] France ................. 82 15866

[51] Int. Cl.[4] .............................................. F16D 3/66
[52] U.S. Cl. ............................ 192/70.17; 192/106.2; 464/67
[58] Field of Search ............... 192/106.1, 106.2, 70.17; 464/66, 67, 5, 6

[56] References Cited

U.S. PATENT DOCUMENTS 4,157,136 6/1979 Salle .................................. 192/106.2
4,376,477 3/1983 Loizeau ........................... 192/106.2

FOREIGN PATENT DOCUMENTS 15204 9/1980 European Pat. Off. .

Primary Examiner—Larry I. Schwartz
Attorney, Agent, or Firm—Charles E. Brown; Charles A. Brown

[57] ABSTRACT

In a centrifugal actuator device, comprising in the known manner at least one actuator member (50) of generally curved shape so that it may be positioned along a circumferential track (39) on a rotary member (11), being coupled thereto by the engagement of a slot (51) over a radial lug (40) of the track (39) extended by a retaining tab (41) which is at least partially cantilevered, said actuator member (50) is, in accordance with the invention, substantially rigid, and it permits radial play between the track (39) and the retaining tab (41), being elastically urged into contact with the track (39) by a spring (60) confined between it and said tab.

Application: rotational coupling of coaxial parts, in particular in clutch disk assemblies.

20 Claims, 6 Drawing Figures

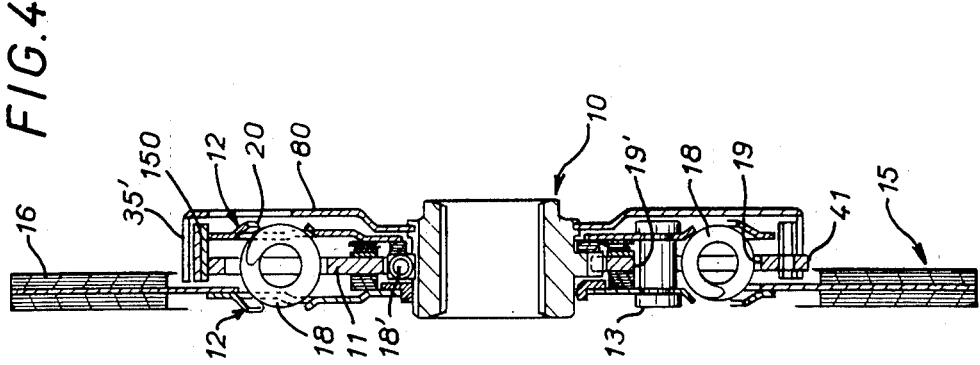
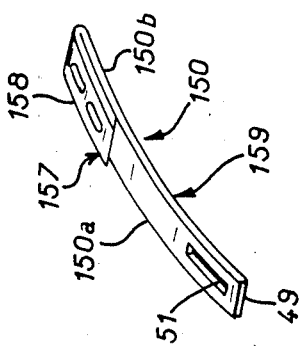
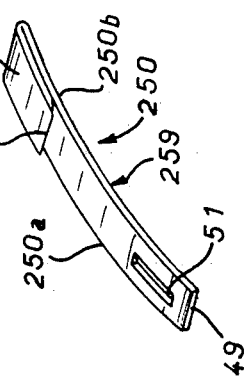
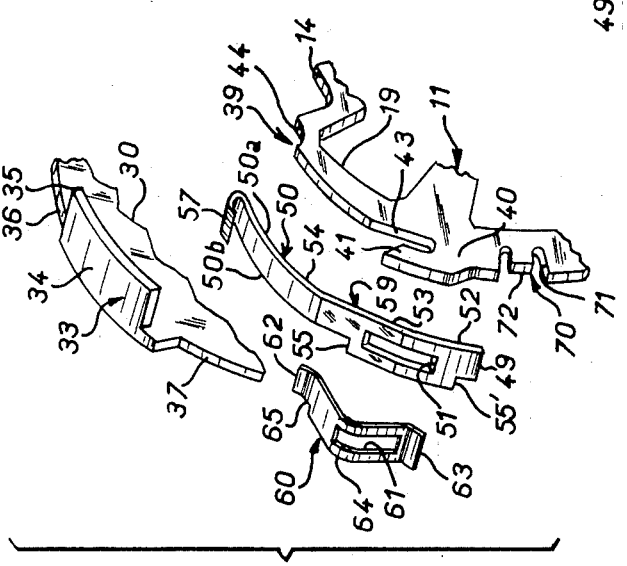

CENTRIFUGAL ACTUATOR DEVICE, IN PARTICULAR FOR A CLUTCH DISK ASSEMBLY

The present invention is generally concerned with a centrifugal actuator device of the kind comprising at least one actuator member of generally curved shape so that it may be positioned along a circumferential track on a rotary member, being coupled thereto by the engagement of a slot over a radial lug of the track extended by a retaining tab which is at least partially cantilevered. It applies in particular to torsional damper devices, in particular for clutch disk assemblies, in which two rotating parts are rotationally coupled in such a way as to disable circumferentially acting elastic means.

Coupling or locking devices of this kind are already known through applications EPO No. 015 203A1 and EPO No. 015 204 A1 in particular, filed in the name of this applicant. These documents put forward various locking devices, in slightly different contexts; one in particular comprises, carried by radially opposed tracks disposed on the periphery of the two rotating parts, chamfered axial bearing rims in the case of that of the two parts which is on the outside in the radial direction, and elastically deformable arms in the case of the other part, extending circumferentially and which, on the one hand, carry a hooking member, such as a tang, which is adapted to cooperate with said bearing rims above a limiting rotation speed determined by the elasticity of said arm, whilst being on the other hand rigidly attached, at a distance from said tang, to that of the two parts which is on the inside in the radial direction by virtue of the interference fit engagement without radial or circumferential play of a slot over a radial lug extended by a retaining tab which extends circumferentially and in part cantilever fashion from said lug, having a circumferential extent substantially equal to that of said lug.

Although applying to different torsional damper devices, this particular method of disabling part of the circumferentially acting damper elastic means present in both cases has the same serious disadvantage, associated with the problems of reconciling a radial return function of the elastically deformable arms opposing centrifugal forces and a circumferential coupling function operative between the rotating parts in the coupled or locked position. Given the interference fit engagement contributing to the circumferential coupling for the purposes of the radial return function and for the corresponding sensitivity to centrifugal force, the arm must be provided with a counterweight, for which there is not sufficient room, however, unless the surrounding components are modified. Consequently, it seems that implementing the circumferential coupling function results in dimensions for the arm such that its centrifugal lifting off movement from the internal track towards the bearing rims of the external track is achieved only for speeds above 1 700 rpm, much too high in practice.

The objective of the present invention is to overcome this disadvantage and to this end the present invention proposes to dissociate the aforementioned two functions of the arm, by mounting the arm on a lug and a retaining tab of the aforementioned kind, but providing radial and circumferential play sufficient to permit said arm to tilt around said lug in a substantially unrestricted manner, an external return member, adjustable at will, being associated with it so as to cause it to lift off in response to centrifugal force from a speed of 1 200 rpm, for example.

The improvement constituted by an arrangement of this kind is adaptable to the torsional damper devices described in the aforementioned applications; more generally, it is applicable in all cases of intervention by any centrifugal actuator member, whether to bring about locking, electrical contact or any other function.

It is for this reason that the present invention is very generally concerned with a centrifugal actuator device of the kind comprising at least one actuator member of generally curved shape so that it may be positioned along a circumferential track on a rotary member, being coupled thereto by the engagement of a slot over a radial lug of the track extended by a retaining tab which is at least partially cantilevered, characterized in that the actuator member is substantially rigid, and in that it permits radial play between the track and the retaining tab, being elastically urged into contact with the track by a spring confined between it and said tab.

A device of this kind, applied to the particular instance of torsional dampers, provides for eliminating the aforementioned disadvantages since the dimensions of the actuator member are no longer limited, this member no longer participating by virtue of its elasticity in the radial return function proper: it can in fact have any stiffness whatsoever.

The invention proposes in particular that the external radial return spring is formed by a curved elastic leaf member adapted to be engaged, in the same manner as the actuator member, by means of a slot on the radial lug extended by its retaining tab so as to bear at its ends on the actuator member in two circumferentially staggered areas, and at its central part under the retaining tab; this of course makes it extremely easy to manufacture whilst providing a considerable range of adjustment for said spring.

The invention furthermore recommends that the end of the actuator member circumferentially opposite a part forming a counterweight relative to the slot is adapted to abut against a substantially radial wall of the track carrying the retaining tab in order to provide said actuator member with appropriate support for its tilting movement relative to said lug. A support of this kind independent of the lug facilitates tilting of the actuator member without causing any wear of said lug.

A radial wall of this kind is preferably formed by a notch or joggle disposed radially in the rotating part carrying the internal track, under the level of the latter, so as to optimize the angular tilting movement of said actuator member. This notch is substantially rectangular, for example, its corners being rounded to prevent unwanted concentration of stress. The back wall of said joggle is advantageously disposed close to the level of the support track so as to contribute to the supporting of the actuator member in the radial direction when it tilts.

For obvious reasons of simplicity of manufacture, the actuator member is preferably constituted by strip or leaf members of flattened rectangular cross-section, the active coupling member, in the case of application of the invention to a rotating part coupling device, being obtained by bending one end of said strip, or by folding over a certain length, or by rigidly attaching a complementary section of leaf member, this list not being limiting.

The actuator members advantageously have a constant curvature; it may be preferable, in certain cases, to implement on their internal surface a number of segments of different curvature: a first having a curvature substantially equal to that of the track on which the arm rests, a rectilinear segment comprising at least part of the slot and cooperating with a flat formed on the track around the fixing lug in order to provide a constant distance between said track and the retaining tab (which facilitates the positioning and retention of the actuator member on the fixing lug), and a strongly arcuate segment designed to engage in the aforementioned joggle in order to be optimally supported.

The invention will be better understood after reading the following description given by way of example with reference to the appended drawings, in which:

FIG. 3 is an exploded view in perspective of a centrifugal coupling device from FIG. 1;

FIG. 4 is an axial cross-section through another damper device equipped with a second embodiment of centrifugal coupling device in accordance with the invention;

FIG. 5 is a view in perspective of the actuator member used in the damper device of FIG. 4;

FIG. 6 is a view in perspective of an alternative embodiment of actuator member usable in the damper device of FIG. 4.

FIGS. 1 to 3 illustrate, by way of example, one embodiment of the invention applicable within the context of the torsional damper device structure described in the aforementioned application EP No. 0 015 204 A1.

Figure 2:
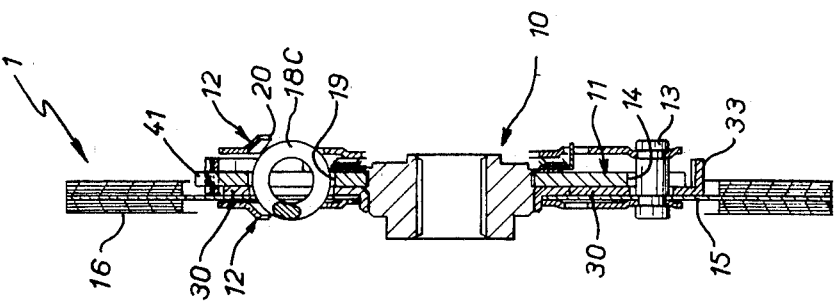
FIG. 2 is an axial cross-section through the damper device of FIG. 1 on the broken line II—II.
Figure 1:
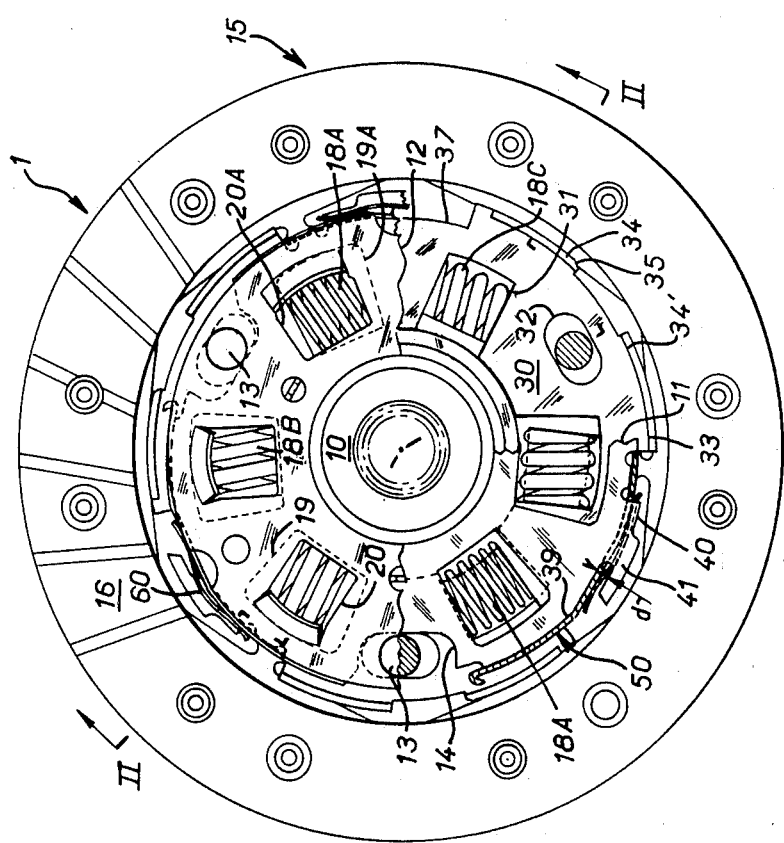
FIG. 1 is a partially cutaway view in elevation of a torsional damper device fitted with a centrifugal coupling device in accordance with the invention.

FIGS. 1 and 2 illustrate a damper hub clutch disk assembly 1 which comprises, in the conventional manner, a hub 10, a hub flange 11 radially surrounding said hub, two annular guide rings 12 which extend parallel to the hub flange 11, one on each side of the latter, and which are connected to one another by axial pegs 13 which pass through the hub flange 11 by means of notches 14 provided for this purpose in the periphery of the latter, as well as a friction disk 15 which carries on each side of its periphery a friction facing 16.

In the embodiment shown, the friction disk 15 is rigidly attached to the guide rings 12 by means of the aforementioned pegs 13; likewise, the flange 11 and the hub 10 are rigidly attached together. The guide rings 12 are movable in rotation relative to the hub 10 and to its flange 11 within predetermined limits of relative angular movement, against circumferentially acting elastic means represented in the form of helical springs 18A, 18B and 18C of increasing stiffnes, extending tangentially relative to a circumference of the assembly, and distributed in diametrically opposed pairs.

The springs 18A of lower stiffness are housed in openings 19A in the hub flange and openings 20A in the guide rings which have substantially the same circumferential extent. These springs are mounted in opposition in a manner known per se, one end of the spring 18A bearing on a radial edge of the opening 19A in the hub flange and the other end of said spring bearing on a radial edge of the opening 20A in the guide rings 12.

On the other hand, the springs 18B and 18C of greater stiffness, which may be identical where necessary, are housed in the flange 11 and the guide rings 12 in openings 19B, 19C and 20B and 20C. The openings 19 other than 19A have a circumferential extent greater than that of the openings 20 other than 20A, as a result of which there exists circumferentially play which corresponds to relative angular movement against the springs of lower stiffness.

It is well known that this increasing relative angular movement of the flange 11 relative to the guide rings 12 results in the successive coming into action of the springs of increasing stiffness. This aspect of the clutch disk assembly not constituting the object of the invention, it will not be described in more detail before [sic].

As is known from the second of the aforementioned applications, an annular ring 30 is disposed around the hub 10, axially interposed between the friction disk 15 and the hub flange 11. The annular ring 30 is coupled to the hub 10 only by the engagement of openings 31 on certain of the elastic members, 18C in the example of FIG. 1. Openings 32 are formed in it for the pegs 13 to pass through.

Thus as is seen in the bottom righthand guadrant of FIG. 1, the annular ring 30 comprises a discontinuous peripheral circumferential track 33, formed by three pairs of two sections 34 and 34' which are close together but separated by an axial notch 36 (FIG. 3). At least one axial rim 35 of the axial rims of the facing sections is externally chamfered; these rims are shown in FIG. 1 as being directed clockwise.

The bottom lefthand quadrant of FIG. 1 shows the annular ring 30 on which is superposed the hub flange 11, but not the upper guide ring 12, which appears only in the upper half of this same FIG. 1.

The hub flange 11 features, in a manner known from the second of the aforementioned applications, at its periphery, a track 39 carrying three radial fixing lugs 40 extended radially by a retaining tab 41, at least in part cantilevered. Given that in the embodiment shown by FIGS. 1 to 3 the hub flange consists of a plane plate, or blank, merely cut out, the track carrying the lugs consists of the edge of said plate whereas the retaining tab 41 extends circumferentially cantilever fashion, more precisely in the clockwise direction.

A plurality of actuator members 50, of which there are the same number as there are lugs, is linked or coupled to said track 39 carrying the hub flange 11 by engagement of slots 51 over each of the lugs 40 of the hub flange. The actuator members 50, which here have a locking or coupling function, are sensitive by virtue of a part 50b forming a counterweight to centrifugal force acting against return means; each carries at its end, supported by an arm 50a, an active locking or coupling member forming a tang 57 which is reversibly movable between the idle position in which it has no effect and, above a particular rotation speed conditioned by its return means, a service position in which it bears circumferentially on the annular ring 30 through the intermediary of the chamfered bearing rims 35 formed on its discontinuous outside track, thus furnishing circumferential support to at least one of said elastic members or springs 18A, 18B or 18C, in this way disabling certain of them temporarily and at least in part.

In accordance with the invention, and differing in this from what is proposed in the second of the aforementioned applications, the elasticity of the actuator members 50 is immaterial, and they may in particular be substantially rigid; this was excluded in the aforementioned application. These members 50 permit radial play d between the supporting track 39 and the retaining tabs 41 and are elastically urged into contact with the track 39 by springs 60 confined between them and said retaining tabs. Thus there is no interference fit type engagement, and the retaining means mentioned in the aforementioned application in connection with the corresponding embodiment are here outside said arm, differing in this from the prior art in which the elasticity of the arms is entirely responsible for the elastic return function.

As shown in FIGS. 1 to 3, each of the springs 60 is formed by an elastic flexible leaf member adapted to be engaged, like the associated actuator member, and by means of a slot 61, over the radial fixing lug of said member extended by its retaining tab, so as to bear at its ends 62 and 63 on the actuator member in two circumferentially staggered areas and at its central part 64 under said retaining tab.

As shown in FIGS. 1 to 3, an actuator member 50 consists of a curved leaf or strip member of rectangular cross-section, disposed circumferentially, its axial dimension being larger than its radial dimension. It will be understood that other types of cross-section might be suitable.

As seen in FIGS. 1 and 3, the track supporting the hub flange comprises, at the foot of each fixing lug, on the side opposite the cantilever portion of the retaining tab 41, a joggle 70 adapted to present a substantially radial wall 71 to serve as a bearing surface for one end 49 of the associated actuator member 50 when it tilts against the action of the return means 60. The presence of this joggle offers the advantage of minimizing wear of the lug during such tilting movement. It can be seen in the bottom lefthand quadrant of FIG. 1 that the slots 51 do not abut on the fixing lug 40 in the circumferential direction.

As shown in FIGS. 1 to 3, the joggle 70 has a generally rectangular shape with the corners eliminated by drilling circular holes. The elimination of sharp corners offers the advantage of avoiding all undesirable risk of concentration of stresses. As seen in FIG. 1 in particular, the rectangular shape of the joggle may be extremely flattened; in this way the back 72 of said joggle contributes to retaining the actuator member during its tilting by providing a radial support for it. Said back 72 is then very slightly below the general level whereas the aforementioned circular holes descend well below the level of said back.

The actuator member 50 is adapted to cooperate with the corresponding bearing rim 35 through the intermediary of its tang 57 which passes through the track 33 between the sections by means of a notch 36. The tang is shown in FIGS. 1 and 3 as being obtained by bending the end furthest from the slot in the direction towards the inside track. This being is through an angle of more than 90° so that the tang 57 can bear radially on the bearing rim 35. The angle of bending ($\alpha$) is advantageously supplementary [sic] to the angle of chamfering ($\beta$) of the bearing rim 35 relative to the discontinuous track 33, in other words: $\alpha + \beta = 180°$.

Two other embodiments of a tang of this kind are shown in FIGS. 5 and 6. It is seen in FIG. 5 that the tang, here designated 157, is riveted to the arm of the actuator member designated 150, although any other attachment method could be used. The tang is formed by a chamfered section of a leaf or strip member 158, shown as being of similar geometry to the strip forming the arm, although this is not indispensible to the invention. The angles of chamfering of the bearing rim 35 and of the strip 158 are preferably substantially equal so as to ensure optimum coupling contact.

The FIG. 6 embodiment of a coupling member 250 provided with a tang 257 differs from that of FIG. 5 only in that the strip carrying said tang, designated 258, is integral with the corresponding arm, being obtained by folding over a certain length of the end of said arm farthest from the slot 51.

It should be noted that the tangs 158 or 258 constitute a counterweight which complements that of the arm alone; they thus increase the sensitivity of the actuator member to centrifugal force whence, given identical springs 60, the limiting rotation speed at which said member lifts off is limited relative to the embodiment of FIGS. 1 to 3, in which the counterweight part 50b of the member 50 is limited to the part of the arm comprised between the slot and the tang, in addition to the tang. It should be noted, however, that for a given angular offset in the coupling position between the fixing lug 41 and the bearing rim 35, the embodiments of FIGS. 5 and 6 yield an overall circumferential dimension which is greater than that of FIGS. 1 to 3.

To return to the first embodiment, note that the actuator member 50 comprises on its lower surface 59 which faces the support track 39 three sections of different curvature. A first strongly arcuate section 52 is designed to engage in the joggle 70 of which the abutment wall 71 does not necessarily project in part outside the track 39 so as to be able to fulfil its abutment function. A median section 53 is plane; the slot 51 is formed at least in part in this. This section 53 cooperates with a flat 43 formed on the track 39 opposite the retaining tab 41; a particular function of this flat is to provide a constant radial separation between the track 39 and said tab whilst facilitating the positioning and retaining in position of the actuator members 50 and the return springs 60. A third section, virtually identical to the part 50b of the actuator member forming a counterweight, has a moderate curvature equal to the overall curvature of the track 39 on which it rests in the idle position. Beyond its curved part receiving the section 53 of the actuator member 50 of the track 39 has, facing the tang 57, just in front of the notch 14 designed to permit the passage of a peg 13, a rounded portion 44 which facilitates the lifting off of the actuator member when the latter is not in total contact with the track 39. Its precise dimensions are advantageously decided on at the stage of balancing the clutch disk assembly.

It will be understood, however, that the inside surface of the actuator member may be divided into as many sections of different curvature as may be necessary. In particular, it may feature a constant curvature, as seen in FIGS. 5 and 6 (reference numerals 159 and 259).

Note in FIG. 3 that the axial dimension of the actuator member 50 and of the associated spring 60 is not constant and that there are two shoulders 55 and 55' at the height of the slot 51 and a shoulder 65 opposite the edge 63 of the spring relative to the slot 61. These variations in the axial dimensions are associated with the fact that the annular plate 30 is practically adjacent the hub flange 11, whereas proper engagement of the member 50 and the spring 60 on the associated lug 40 requires the presence of a significant quantity of material all around the slots 51 and 61. It results from this that the parts 50 and 60 impinge on the volume swept out as it rotates by the annular plate 30, whence the necessity to provide transverse notches 37 in the latter. To limit the angular extent of the latter, the parts 50 and 60 do not impinge on the space swept out by the plate 30 over their entire length; they do so only at the height of the slots 51 and 61, between the aforementioned shoulders. The angular extent of the projecting parts delimited by said shoulders must be less than that of the corresponding notch 37 so as to provide for non-null relative angular movement when the parts 30 and 11 are not coupled.

No shoulder of this kind appears on the actuator members 150 and 250 shown in FIGS. 5 and 6. This is due to the fact that these actuator members 150 and 250 are adapted to be employed in a clutch disk assembly as shown in FIG. 4. Its general structure corresponds to that described in the first of the aforementioned applications. Most of the components of FIG. 2 are seen again, subject to slight displacements in certain cases. Thus the pegs 13 linking the guide rings 12 are here interposed between certain of the springs 18 and the hub 10, passing through the hub flange 11 by means of notches 19' formed on the inside radial edges of certain openings 19 in said flange.

In the embodiment shown springs 18' of very low stiffness are interposed between the hub 10 and its flange 11, and they are disabled by coupling said flange to an outside annualr ring 80 rigidly attached to the hub. Given that this ring 80 is external, it does not impinge on the toroidal volume delimited by the actuator members as they rotate, whence the possibility of implementing the actuator members without shoulders. The actuator member in the upper half of FIG. 4 is of the same type as in FIG. 5, also consisting of two different parts. The embodiments of FIGS. 6 and 3 would be equally suitable, the shoulders 55 and 55' being then no longer necessary.

It will be understood that it is possible to combine the various characteristics mentioned in connection with the actuator members without departing from the scope of the invention. Nor is the list of said characteristics exhaustive. The actuator members may be employed in either direction, simultaneously, in head-to-tail relationship, or not; its cross-section need not be rectangular, or even constant. It may comprise any number of parts.

The circumferential tracks contributing to the coupling action are not necessarily situated at the periphery of the rotating parts which carry them.

The use of centrifugal actuator devices of this kind is not limited to the rotational coupling of rotating parts by means of complementary locking means; the actuator members may, for example, operate electric contacts in the position in which they are held against the rotating part, or in their lifted off position; the axial dimensions of said axial parts are naturally immaterial.

Likewise, the invention is equally applicable to the case where the active member such as the tang or electrical contact is disposed opposite the counterweight part relative to the slot, the supporting track then being on the outside.

It will also be understood that the cantilever tabs 41 need not be circumferential, being of axial orientation, for example. As for the slots, they may if necessary have shapes and orientations different to those described hereinabove.

I claim:

1. A centrifugal actuator device comprising two rotary members mounted for relative angular movement, a circumferential support track provided on one of said rotary members, a radial lug extending radially from said one member relative to said track, a cantilevered retaining tab extended from said lug, an actuator member of generally arcuate shape adapted to overlie a portion of said circumferential track, said actuator member being substantially rigid and having a slot by which said actuator member is engaged around said lug with radial and circumferential play, and said actuator member being received partially under said retaining tab so that said actuator member can tilt around said lug in response to centrifugal force, and a spring radially interposed between said retaining tab and said actuator member for elastically normally biasing said actuator member into contact with said track.

2. Device according to claim 1, wherein said spring is formed by a curved elastic leaf member engaged in the same manner as the actuator member by means of a slot on said radial lug extended by said retaining tab so as to bear at ends of said spring on said actuator member in two circumferentially staggered areas and at a central part of said spring under said retaining tab.

3. Device according to claim 2, wherein said actuator member comprises at least one part forming a counterweight, an end of said actuator member circumferentially opposite said part forming said counterweight relative to said slot is positioned to abut against a substantially radial abutment wall carried by said track to serve as a bearing surface for tilting movement of said actuator member against the action of said spring.

4. Device according to claim 3, characterized in that said abutment wall for said actuator member is formed by one flank of a joggle formed in said track and in the direction of the axis of said track below the level of said track.

5. Device according to claim 4, characterized in that said joggle is of a generally rectangular shape in the axial direction with rounded off corners.

6. Device according to claim 5, characterized in that a side forming a bottom of said joggle is sufficiently close to the level of said track to participate in supporting said actuator member in a radial direction when said actuator member tilts.

7. Device according to claim 4, wherein said retaining tab in part extends in cantilever-fashion in the circumferential direction and said track has a flat parallel to and facing said centilever part of said tab.

8. Device according to claim 7, characterized in that said actuator member has an outside surface of constant curvature.

9. Device according to claim 8, characterized in that said inside surface of said actuator member has a plane section cooperatable with said flat on said track, said plane section separating a moderately arcuate section of said actuator member of the same curvature as said track on the same side of said slot as said counterweight, from a strongly arcuate section of said actuator member adapted to enter said joggle.

10. Device according to claim 1, wherein said actuator member comprises an active element carried by an arm characterized in that said arm is a leaf member of which the cross-section is larger in the axial direction than in the radial direction.

11. Device according to claim 1, adapted to ensure, above a predetermined speed, rotational coupling between a first rotary part carrying said actuator member and a second coaxial rotary part carrying a second circumferential track disposed transversely opposite and outside of said support rack, a torsional damper device for a clutch disk assembly having a plurality of springs, at least one bearing member for disabling at least partially at least certain of said springs of said torsional damper device, characterized in that said actuator member has at a distance from said slot of said actuator member a tang cooperatable with a chamfered axial bearing rim of said second circumferential track.

12. Device according to claim 11, characterized in that said actuator member includes a rigid leaf member of which an axial dimension is greater than a radial dimension and of which an end of said leaf member furthest from said slot is bent outwardly through an angle of more than 90° to form a tang.

13. Device according to claim 11, characterized in that said actuator member includes a rigid leaf member of which an axial dimension is greater than a radial dimension and of which an end of said leaf member furthest from said slot is chamfered and then bent over a certain length of said leaf member to form a fold.

14. Device according to claim 11, characterized in that said actuator member includes a rigid leaf member to which is attached a shorter chamfered leaf member.

15. Device according to claim 11, wherein said rotary parts carrying said tracks have no more than a slight axial offset and two rotary parts, said track carrying said actuator member being formed by the edge of a flange of constant thickness requiring the provision of radial notches in said second rotary part for relative angular movement of the actuator member, characterized in that said spring has a slot, said actuator member and said spring enter said notches in an axial direction only at a level of said slots of said actuator member and said spring thereby exposing axial shoulders.

16. Torsional damper device comprising two rotary members mounted for relative angular movement, circumferential spring means opposing such relative angular movement, a first circumferential track provided on one of said rotary members, a radial lug extenting radially from said one member relative to said track, a cantilevered retaining tab extending from said lug, a second track provided on the outside of said first track, a bearing portion provided on said second track, said actuator member being substantially rigid and having a slot by which said actuator member is engaged with radial and circumferential play around said lug, and said actuator member being received partially under said retaining tab so that said actuator member can tilt around said lug in response to centrifugal force, and a spring radially interposed between said retaining tab and said actuator member for elastically normally biasing said actuator member into contact with said track, said actuator member being provided at a distance from slot with a tank cooperatable with said bearing portion for a predetermined relative angular displacement between said two rotary members above a predetermined speed coupling of said rotary members and at least partially disabling of at least some of said circumferential spring means.

17. Device according to claim 16 characterized in that said actuator member includes a rigid leaf member of which an axial dimension is greater than a radial dimension and of which an end of said leaf member furthest from said slot is bent outwardly through an angle of more than 90° to form said tang.

18. Device according to claim 16 characterized in that said actuator member includes a rigid leaf member of which an axial dimension is greater than a radial dimension and of which an end of said leaf member furthest from said slot is chamfered and then bent over a certain length of said leaf member to form a fold.

19. Device according to claim 16 characterized in that said actuator member includes a rigid leaf member to which is attached a shorter chamfered leaf member.

20. Device according to claim 16, wherein said rotary members carrying said tracks have no more than a slight axial offset between said two rotary members, said track carrying said actuator member being formed by the edge of a flange of constant thickness requiring the provision of radial notches in said second rotary member for relative angular movement of the actuator member, characterized in that said spring means has a slot, said actuator member and said spring means enter said notches in an axial direction only at a level of said slots of said actuator member and said spring means thereby exposing axial shoulders.

* * * * *